2,559,032

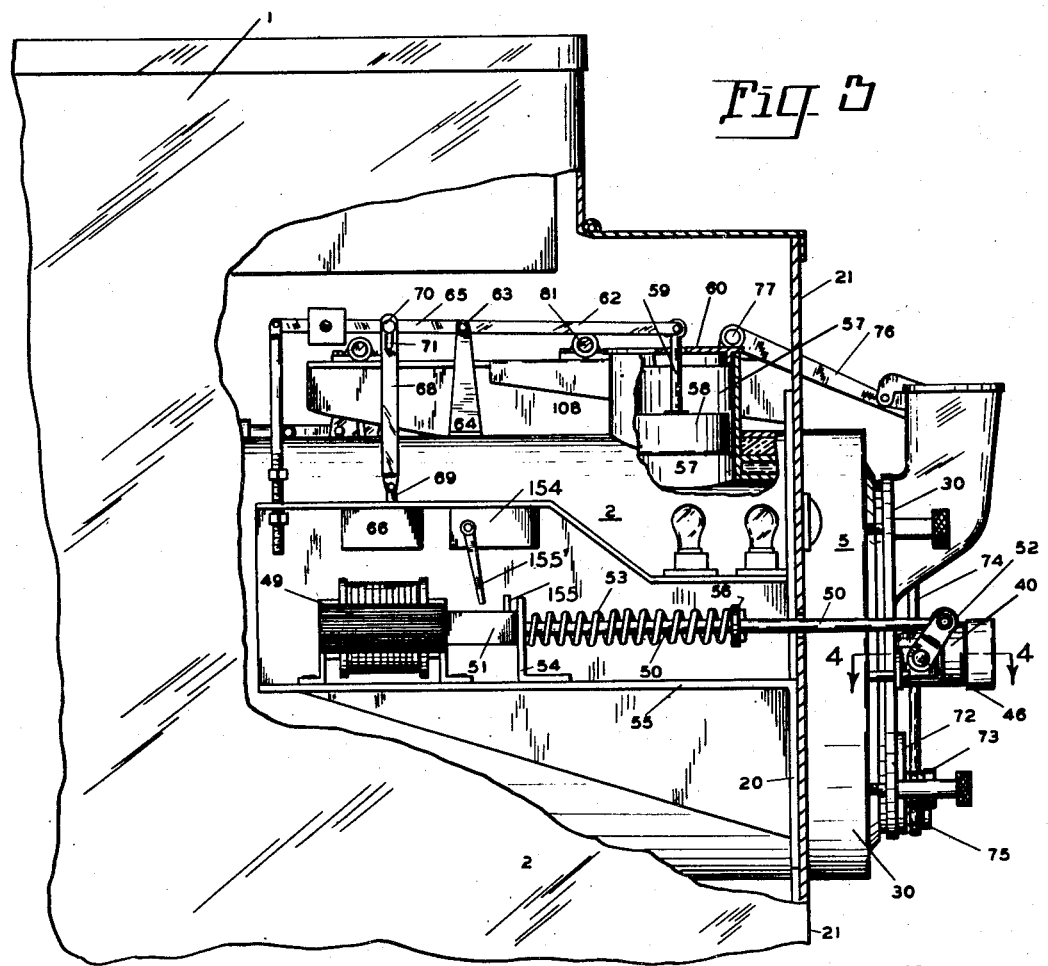
Fig. 3
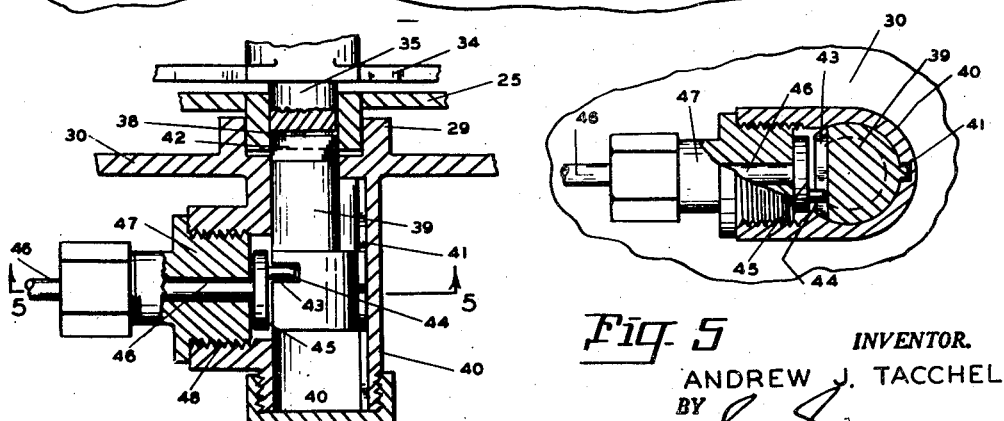
Fig. 4
Fig. 5
INVENTOR.
ANDREW J. TACCHELLA
BY
ATTORNEY July 3, 1951 A. J. TACCHELLA 2,559,032
ICE CREAM AND FROZEN CONFECTION FREEZER AND DISPENSER
Filed April 24, 1946 6 Sheets-Sheet 5
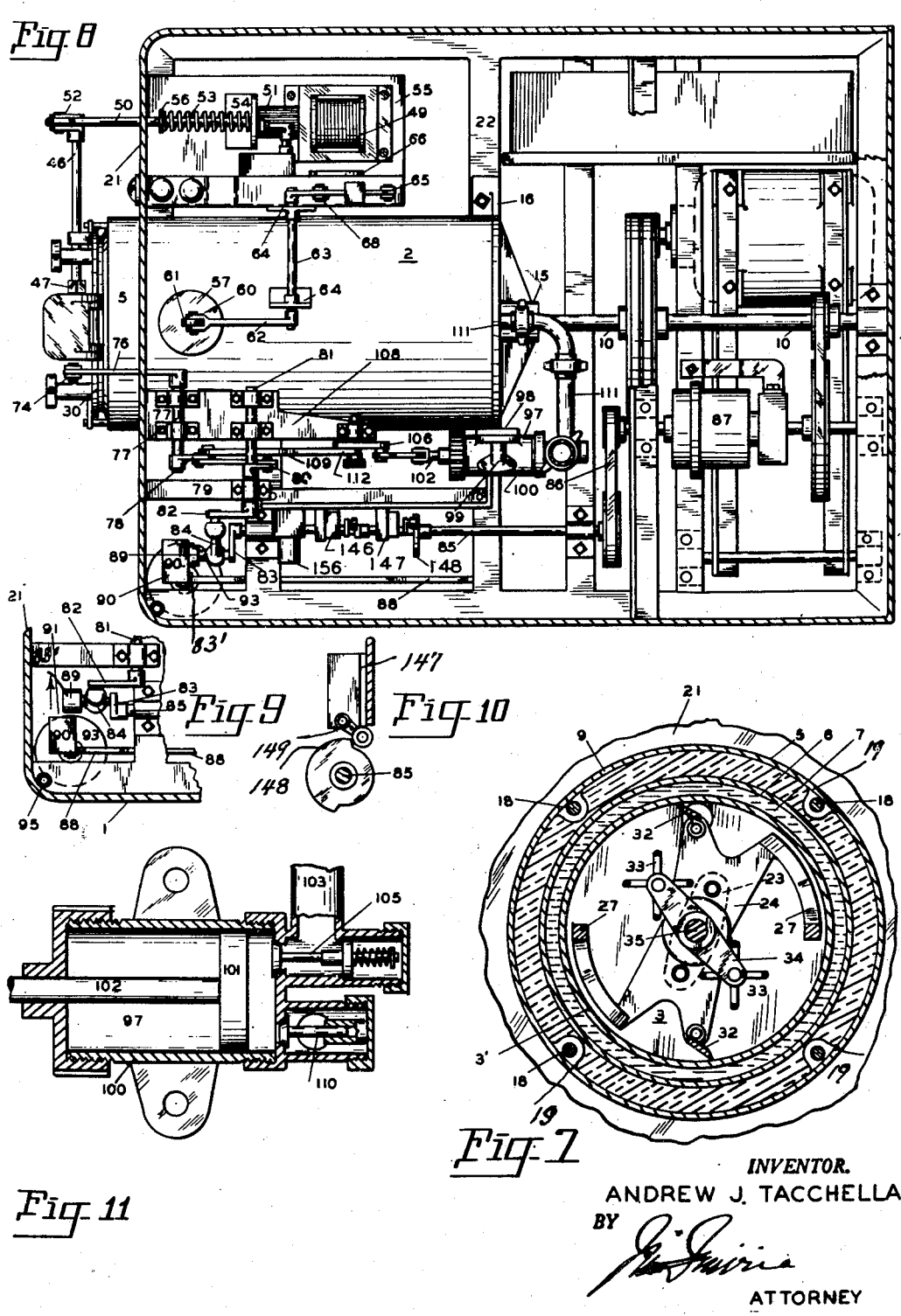
INVENTOR.
ANDREW J. TACCHELLA
BY 
ATTORNEY July 3, 1951
A. J. TACCHELLA
2,559,032
ICE CREAM AND FROZEN CONFECTION FREEZER AND DISPENSER
Filed April 24, 1946
6 Sheets-Sheet 6
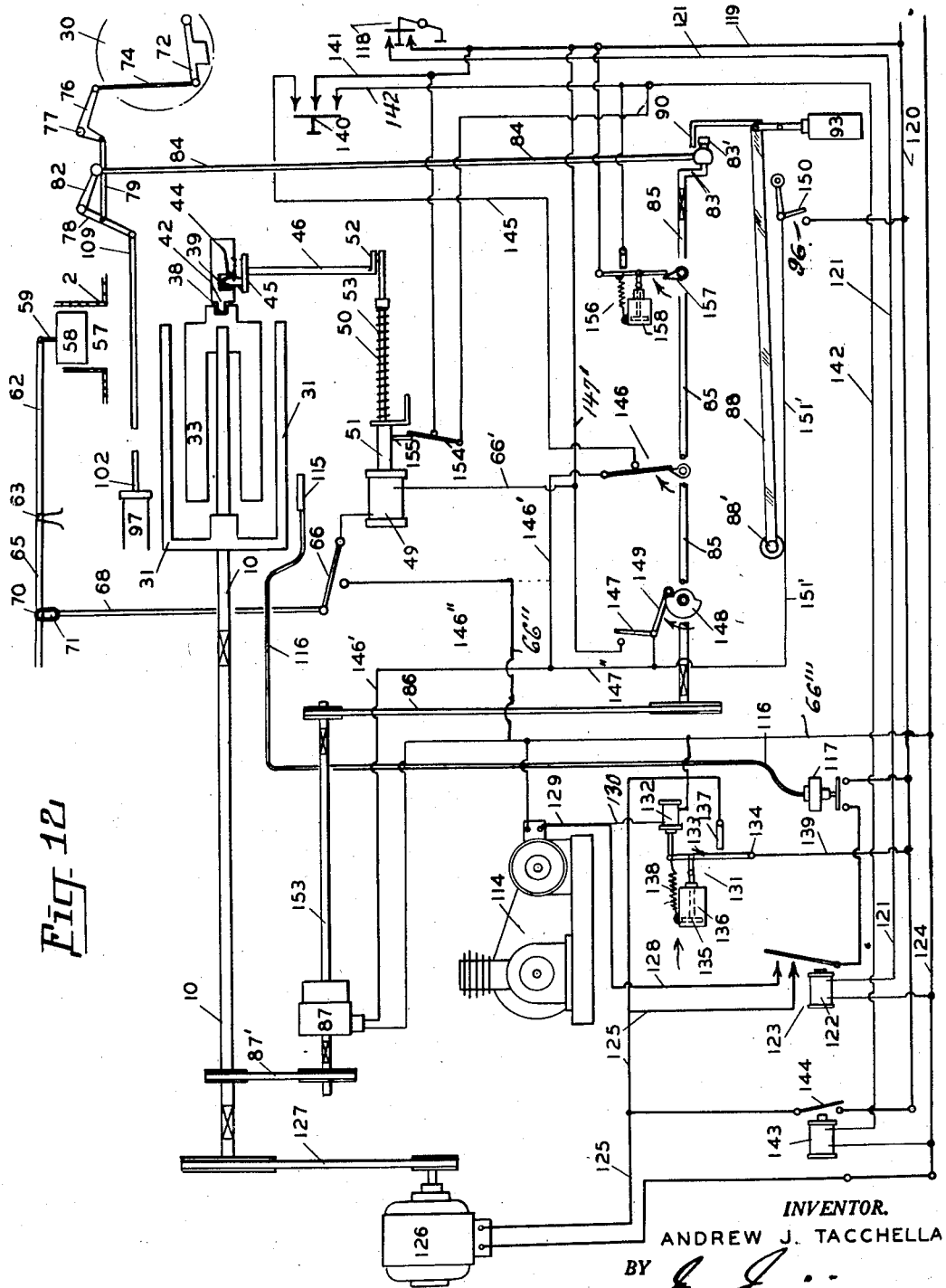
INVENTOR.
ANDREW J. TACCHELLA
BY
ATTORNEY Patented July 3, 1951

UNITED STATES PATENT OFFICE 2,559,032

ICE CREAM AND FROZEN CONFECTION FREEZER AND DISPENSER

Andrew J. Tacchella, Portland, Oreg., assignor, by mesne assignments, to Steady-Flow Freezer Co., a corporation of Oregon Application April 24, 1946, Serial No. 664,670

26 Claims. (Cl. 62—114)

My invention relates to continuous operating ice cream and frozen confection freezers, which is particularly adapted for push button or coin actuated operation.

The primary object of my invention is to replace a given amount of unfrozen mix for a given amount of frozen ice cream or confection having been withdrawn.

Another object of my invention is the provision of automatic control means for governing the over-run of the product maintaining the over-run at a predetermined consistency which will be determined by the desires of the operator.

A further object of the invention is to provide automatic control relative to the refrigeration and the operation of the mixing paddles.

Another object of my invention is the provision of automatic and adjustable measuring means for the amount of frozen product being dispensed which provides for a consistent measure being withdrawn.

A still further object of my invention is the provision of automatic mechanism controlled by the swell of the product for disconnecting the whipping means, thereby stopping the swell of the product being frozen.

And another object of my invention is the provision of a dispensing means control, either manual or by coin actuator, wherein the machine will complete the dispensing operation without interference until this cycle has been completed.

These and other incidental objects will be apparent in the drawings, specification and claims.

Referring to the drawings:

Figure 3 is a fragmentary side view taken on line 3—3 of Figure 1, parts broken away for convenience of illustration. This view particularly illustrates the over-run control system.

Figure 4 is a fragmentary sectional view, taken on line 4—4 of Figure 3, illustrating the throw-out mechanism for controlling the beater or paddle mechanism within the freezer.

Figure 5 is a sectional view taken on line 5—5 of Figure 4.

Figure 7 is a front sectional view of the freezing chamber taken on line 7—7 of Figure 6.

Figure 8 is a plan sectional view taken on line 8—8 of Figure 2.

Figure 9 is a fragmentary view of the cam shaft for operating the dispensing gate and the electrical control switches, said shaft having been revolved to a point for completing the opening of the ice cream dispensing gate and breaking the electric circuit controlling the magnetic clutch.

Figure 10 is a fragmentary end sectional view of the cam shaft shown in the position of Figure 9 and illustrating the cam having opened the electric circuit to the magnetic clutch.

Figure 11 is a sectional view through the mix dispensing pump illustrating its principle of operation.

Figure 12 is a diagrammatical layout of the principal units of my new and-improved freezing machine, including the electric wiring circuits.

In the drawings:

Figure 1:
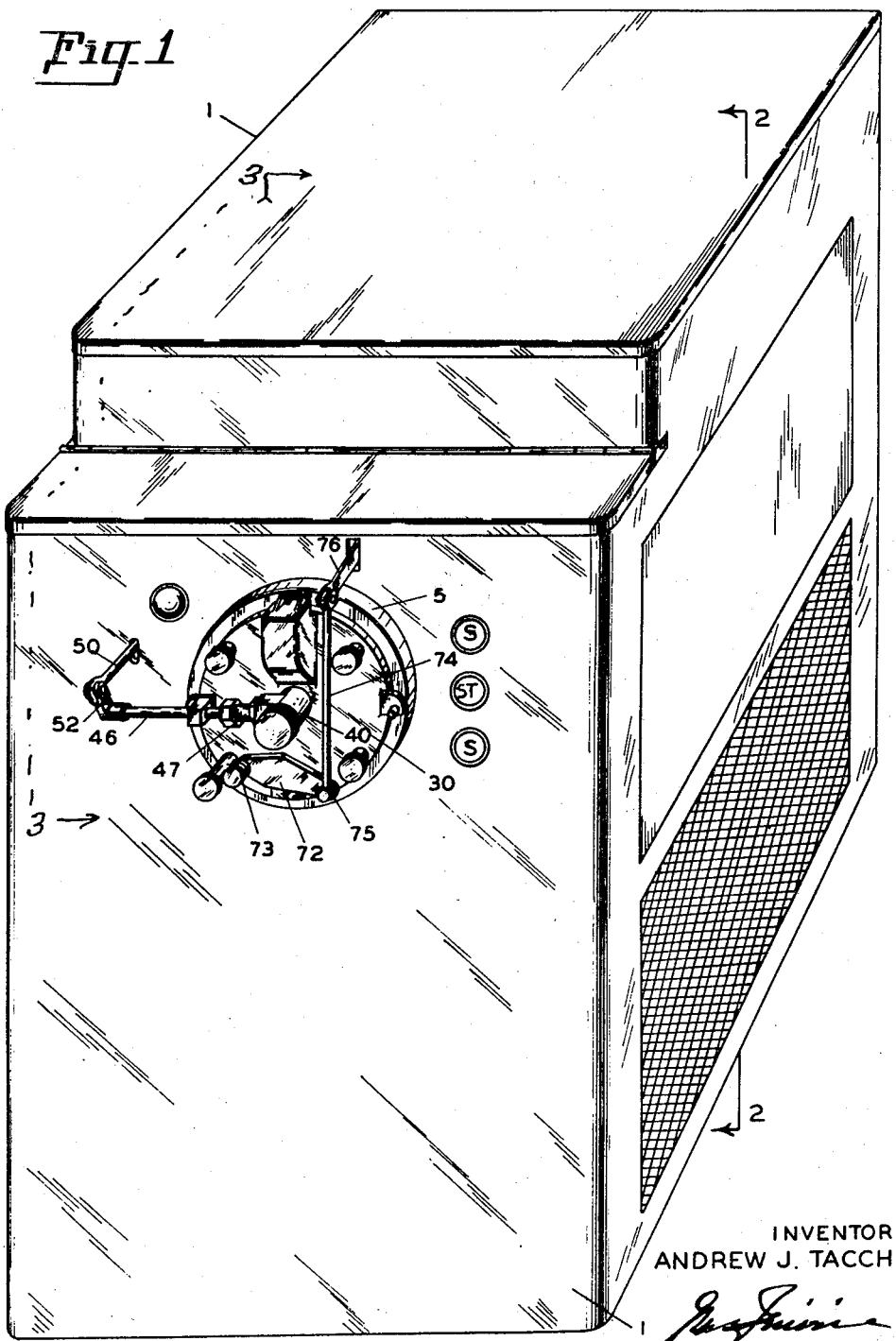
Figure 1 is a front perspective view of my new and improved ice cream and frozen confection freezer and dispenser.

My new and improved continuous ice cream and confection freezer consists of a cabinet 1, having a freezing unit 2 mounted therein. The freezing chamber 3 within unit 2 consists of an inner circular drum 3' mounted between the inner closed end 4 within the cabinet and the outer ring 5 located on the front side of the cabinet.

A drum 6 surrounds the freezing chamber 3, having a space 7 therebetween for either a flooded system of refrigeration or a coil system, in this particular case I have illustrated a flooded system. Insulation 8 is provided around the drum 6 and an outer casing 9 surrounds the assembled units.

A shaft 10 is journalled within the hub 11 forming part of the end wall 4 and having a suitable seal, such as the rubber washer 12 forced against the end of the hub at 13 by the spring 14, insuring a liquid tight seal. An outboard bearing 15 forms part of the supporting frame 16. The frame 16 is spaced apart from the end of the freezer 4 by the spacers 17. Bolts 18 pass through the frame 16, spacers 17, through the end 4 and are threaded into the bosses 19. These bolts, preferably four in number whose positions are indicated in Figure 7, hold the entire freezer assembly together.

The reenforcing plate 20 on the front side 21 of the cabinet 1 supports the forward end of the freezer while the frame 16 rests upon the cross beam 22 supporting the rear of the freezer. A flanged hub 23 is fixedly secured to the inner end of the shaft 10. This hub supports and drives the scraper bar and paddle assemblies. This assembly consists of end spiders 24 and 25 connected together by longitudinally mounted rods 26 and spirally mounted bars 27. The forward spider 25 has a hub 28 journalled within the bearing 29, located within the removable end 30.

Pivotally mounted on the rods 26 are scraper bars 31 and 32. These bars operate within the freezing chamber when the refrigeration system is in operation and when the product is being dispensed. The spirally arranged rectangular bars 27 are for the purpose of forcing the product to the front of the freezer.

The paddles 33 are pivotally mounted to the spiders 34, which are fixedly mounted to the shaft 35. A hub 36 is mounted to the inner end of the shaft 35 and is rotatably mounted upon the spindle 37 extending from the shaft 10. The opposite end of the shaft 35 is mounted within the hub 28 of the spider 25 and has a cross slot 38 on its outer end. A locking bolt 39 is slidably mounted within the hub 40 and is prevented from rotation by the keyway 41. This locking bolt has a tongue 42 which engages the slot 38 of the shaft 35. The locking bolt 39 has a cross slot 43 on its opposite end for engaging the crank pin 44. This crank pin, as shown in Figs. 4 and 5, is fixedly secured to the crank 45 which forms part of the shaft 46. The crank and shaft are held in position by the combination bearing and stuffing box 47 threaded within the boss 48 of the hub 40.

The locking bolt 39 is operated by the crank 45 and the shaft 46 by an electric solenoid 49. An operating rod 50 is fixedly secured to the core 51 of the solenoid 49 at its one end and is pivotally connected to the crank 52 at its opposite end, as shown in Fig. 3. The crank 52 is keyed to the shaft 46. A spring 53 is interposed between a stationary bracket 54, which is fixedly secured to the solenoid supporting base 55, and the washer 56, which is keyed to the shaft 50. This spring normally holds the tongue 42 of the locking bolt 39 in the slot 38 of the paddle shaft 35 and thereby stops the rotation of the paddles. When these paddles are held stationary the product is in the process of being whipped due to the fact that the scrapers revolve the product around the paddles 33, thoroughly mixing and swelling the same.

Figure 6:
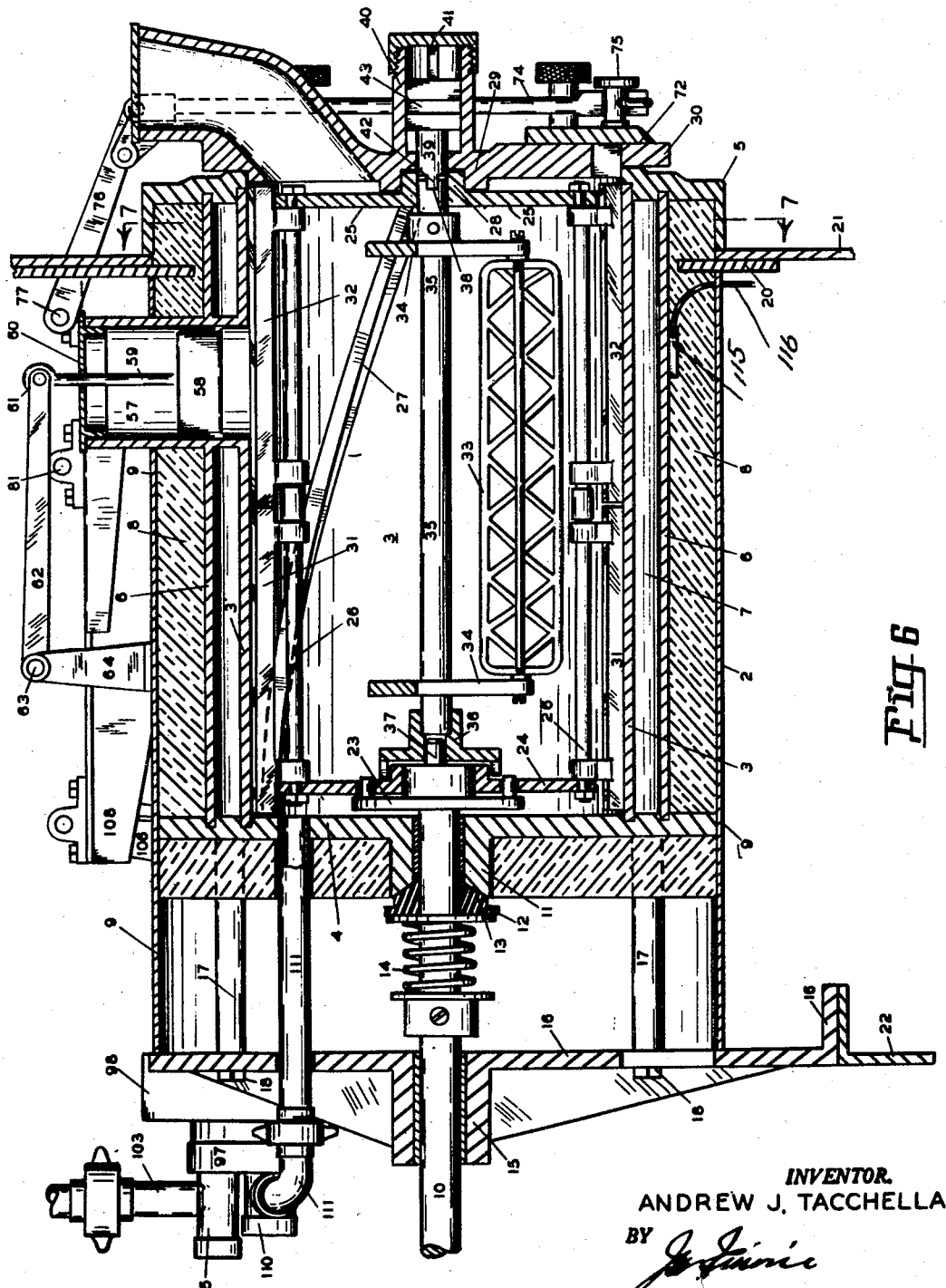
Figure 6 is a longitudinal side sectional view of the freezing chamber.

A well 57 is secured to and in communication with the top of the freezing drum 3 and extends upwardly, as best illustrated in Figures 3 and 6, and this well is open at the top and has a float 58 slidable therein. This float has a stem 59 extending upwardly through the lid 60 of the well 57. The upper end of the stem 59 is pivotally connected at 61 to the bar 62, which is fixedly keyed to the cross shaft 63, said shaft being mounted in suitable bearing supports 64.

Referring to Figure 3 a crank arm 65 is keyed to the shaft 63 and operates the switch 66, energizing the solenoid 49. When the float 58 rises in the well 57 it lowers the crank arm 65, along with a link 68 which is connected to the switch plunger 69 at its lower end and secured to the bar 65 by the shoulder bolt 70, said bolt working within the slot 71. When the float rises its full travel the end of the slot 71 will contact the bolt 70 forcing the link 68 downwardly, closing the switch 66, completing an electric circuit, as shown in the diagram, Fig. 12, from the positive side of the line 120, through the conductors 119, 147', 66', switch 66, conductors 66'' and 66''' to the negative line 124, thereby energizing the solenoid 49 which will draw the rod 50 against the spring 53, pulling the crank arm 52 towards the same, rotating the shaft 46 causing the crank 45 to pull the locking bolt 39 and its tongue 42 out of engagement with the slot 38 of the shaft 35, thereby allowing the paddles 33 to revolve with the scraper bar assembly. When this happens there will be no beating of the product and the over-run of the product will be stopped.

When the swell diminishes within the freezing chamber it will allow the float 58 to lower within the well 57 rocking the bars 62 and 65 about the shaft 63 raising the bolt 70 within the slot 71 and, when it reaches the upper end of the slot, the link 68 will open the switch 66 demagnetizing the solenoid 49 and allowing the spring 53 to re-engage the paddles with the scrapers, again mixing the product and causing it to swell.

Figure 2:
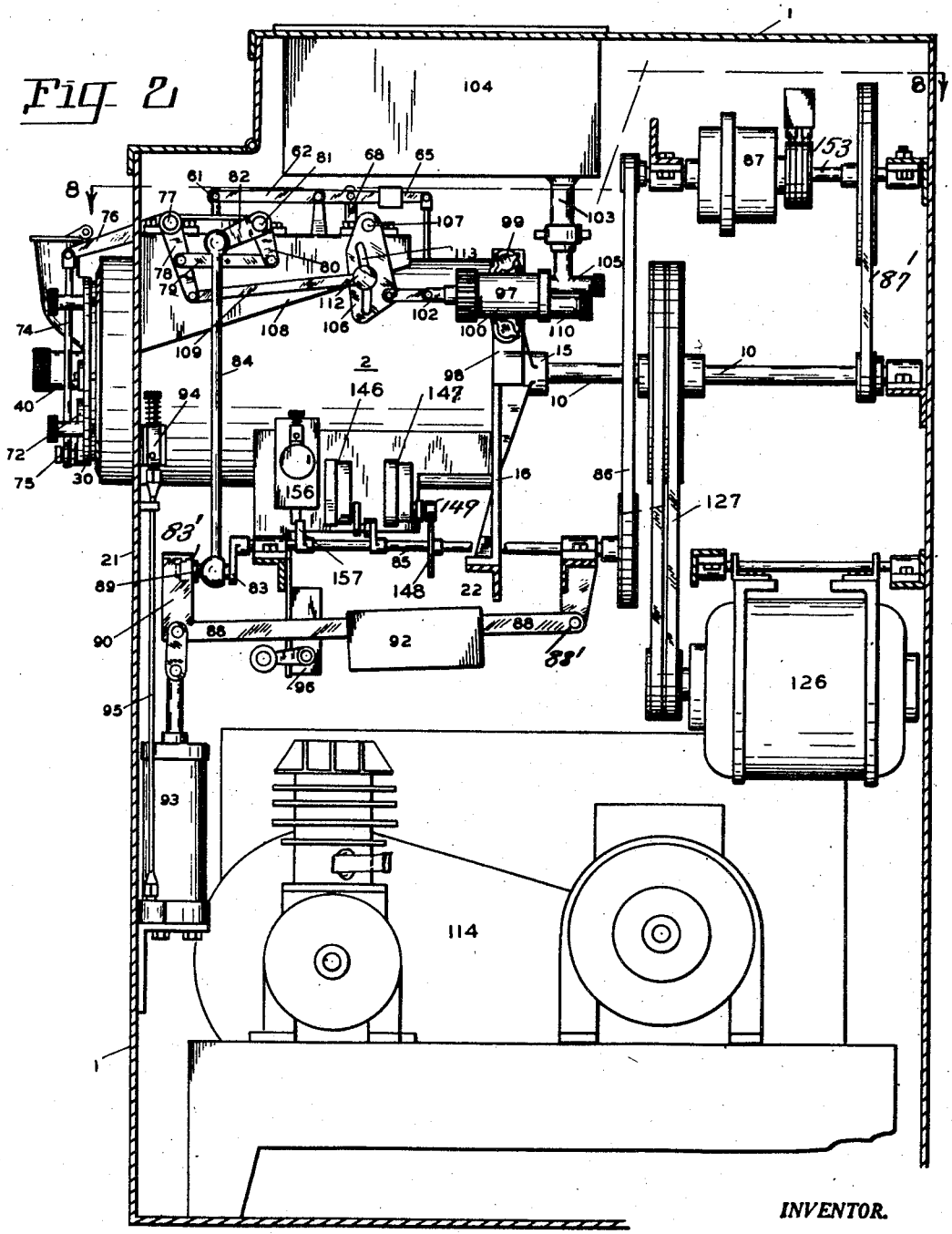
Figure 2 is a side sectional view, taken on line 2—2 of Figure 1, looking in the direction indicated.

I will now describe the mechanism for dispensing the product from the freezer and for replenishing the product with additional mix to replace that which has been withdrawn. Referring to Figures 1, 2, 6 and 8, a dispensing gate 72 is pivotally mounted at 73 to the front end 30 of the freezer. The opposite end of the gate 72 is raised and lowered by the rod 74, which is pivotally connected thereto by a pivot 75 and to a lever 76 which is keyed to the shaft 77 within the cabinet 1, referring to Figure 2. The shaft 77 has a crank 78 at its opposite end and which is connected by a link 79 to a crank 80, which is keyed to the shaft 81. A crank 82 is keyed to the shaft 81 and is connected to a crank 83 by a connecting rod 84. The crank 83 is keyed to a cam shaft 85. The cam shaft 85 is rotated by the belt 86, said belt being driven by a magnetic clutch 87, the operation of which will be described later. When the crank 83 is in its lowered position, as indicated in Figures 2 and 8, the gate 72 will be closed by the above described linkage and lever assemblies, but when it has been revolved to the point illustrated in Figure 9 the gate will have been opened by the said linkage and lever assembly.

In the dispensing operation it is desired to hold the gate 72 open for a predetermined length of time, this being accomplished by the pivotally mounted lever 88 being raised by the crank 83. The crank pin 89 extends outwardly from the crank and engages the underside of the bracket 90, which forms part of the lever 88. As the crank 83 is raised from the position shown in Figure 2 to the position shown in Figure 9 this bracket 90 and lever 88 will be raised to its upper position at which time the crank pin 89 will disengage from the bracket 90 at 91 allowing the lever 88 to be lowered by the weight 92, the lowering of this lever will be retarded by the dash pot 93, which has an adjustable escape valve 94 connected by a tube 95 for allowing the air to escape from the dash pot at a predetermined rate.

When the crank pin 89 has reached its upper position, as shown in Figure 9, the gate will be open and it is desired to stop the crank in its travel until the lever 88 is in its lowered position, at which time the switch 96 will be closed by the said lever, causing the crank to complete its cycle of rotation, thereby closing the dispensing gate 72 by the above described lever and linkage assembly. A more clear description of the operation will be described later by the use of the diagrammatical layout.

When the product is dispensed through the gate 72 it is also desirable to replace the same with the proper amount of mix. A pump 97 is removably secured to the bracket 98 by the wing nuts 99. The pump 97 consists of a cylinder 100, having a piston 101 working therein and operated by the piston rod 102. A supply pipe 103 delivers mix from the vat or container 104 through the check valve mechanism 105 into the cylinder 100 when the piston rod 102 is pulled outward, toward the left from the position shown in Figure 11. This is accomplished by the rocker arm 106 which is pivotally mounted at 107 to the frame 108. When the crank 78 is moved to open the gate it will pull the rocker arm 106 to the left by the link 109, pulling the piston 101, as above described, to the left, drawing in a supply of mix through the valve 105. When the gate 72 is closed the crank 78 will push the link 109 to the right causing the piston rod 102 to force the piston to the right and forcing the mix through the check valve 110 to the tube 111 (Fig. 6) and through the end 4 of the freezer into the freezing chamber 3.

The amount of mix being transferred into the freezing chamber can be varied by the adjustment of the end 112 of the link 109 in regards to the slot 113 of the rocker arm 106. As the link is raised there will be a greater amount of travel transmitted to the piston 101, thereby a greater amount of mix will pass through the pump into the freezing chamber and vice versa. By lowering the link 109 within the slot 113 the amount of movement of the piston will be decreased. It will be noted that the position of the slot relative to the rocker arm and the link 109 will always return the piston 101 to full travel to the right, thereby discharging all of the mix from the pump cylinder.

I will first describe the freezing operation, referring to Figure 12. A refrigerating unit 114 is located on the lower part of the cabinet 1 and is piped up to the refrigeration space 7 of the freezing unit. In this case I have shown a flooded system, and I have not attempted to show any piping or detail of connecting the same.

I illustrate in the diagram a thermostatic control unit 115, this control unit would be located in or adjacent the freezing space 7 and having the usual fluid tubing 116 leading to the thermostatic control switch 117. When the operator desires to start the machine the control switch 118 is closed completing an electric circuit through the conductor 19 leading from the main line 120 through the switch 118, conductor 121, through the solenoid 122 of the relay switch 123, back to the main line 124. This will close the said relay, but the relay switch 123 will not complete an electric circuit unless the thermostatic control switch 117 is closed and this switch will only be closed in the event that the machine requires refrigeration, but if it does it will close, then an electric circuit will be completed from the main line 120 through the switch 117, through the relay 123 into the conductor 125 to the motor 126 thence to the other main line 124.

This motor 126 drives the scraper and beater assembly as described before, through the shaft 10 and the drive belt 127. Electric energy will also be delivered from the relay 123 through the conductor 128 to the refrigeration unit 114 by way of the conductor 129 thence through conductor 66''' to the other main line 124. An electric circuit will also be completed through the conductor 130 to the delayed relay switch 131, thence to conductor 66''' and main line 124. When the solenoid 132 is energized it will pull the lever 133 to the right in the direction of the arrow about its pivot 134, which also pulls the piston 135 to the right in the direction of the same arrow within the dash pot 136, and closing the switch contacts 133 and 137.

The object of the delayed relay switch 131 is to maintain the rotation of the scraper and paddle assembly for a period of time after the refrigeration unit 114 is cut out of the circuit by the switch 117. When the temperature is lowered to the proper degree within the space 7 of the freezing unit the control 115 will open the switch 117 which breaks the circuit through the relay 123 and the refrigeration unit 114, as well as de-energizing the solenoid 132. The switch lever 133 will then begin to travel in the opposite direction of the arrow due to the action of the spring 138, but the piston 135 within the dash pot 136 will retard this movement for a period of time, thereby allowing the electric energy through the conductor 139 to flow from the main line 120 through the switch bar 137 into the motor 126 maintaining its operation a predetermined period of time. The object is to prevent the freezing of the mixing assembly within the freezer unit.

I will now describe a cycle of operation in the dispensing of a measured amount of product. The switch 140 may either be operated manually or by a coin actuator, and when it is closed it will close two circuits, one circuit through the motor 126 operating the mixing assembly within the freezer and the other for operating a magnetic clutch 87, said clutch driving the cam shaft 85 for operating a multiple of switches in carrying out the dispensing of the product and the replenishing of the same.

First electric energy, when the switch 140 is closed, is delivered from the conductor 119 through the conductor 141 through the switch conductor 142 to the relay 143, electric energy will then be delivered through the relay from the main line 120, switch bar 144 to the conductor 125 into the motor 126, causing the mixing assembly to start operation. When the switch 140 was closed electric energy was also delivered through the conductor 145 into the switch 146, thence through the conductor 146' to the magnetic clutch 87 closing the same, which will rotate the shaft 153 and the cam shaft 85 through the belt 86. This switch 146 is closed while the cam shaft is in the position shown in all of the drawings, except Figure 9, and will be opened as soon as the cam shaft starts to revolve. The object of which is to prevent the operator from closing another circuit through the starting switch 140 until a complete cycle of operation of dispensing has been completed.

As soon as the cam shaft 85 begins to revolve it will begin to raise the pivotally mounted bar 88 about its pivot point 88' by the action of the crank 83 and the cam roller 83' raising the bracket 90 to the position shown in Figure 9. This also pulls the piston within the dash pot 93 to the top of its travel. The object of which has been described above. The connecting rod 84 is also raised at this time, operating the bell crank 76 through the system of levers and linkages as above, pulling the rod 74 upward and opening the gate 72. This gate will remain open until the dash pot 93 permits the bar 88 to reach the bottom of its travel.

Due to the fact that the switch 146 is only momentarily closed, a switch 147 is operated by the cam 148 mounted upon the cam shaft 85. When the cam shaft starts to move the cam 148 operates the switch arm 149 to close the switch 147, causing electric energy to flow through the conductor 147', through the switch 147, into the conductor 147'', into the line 146' to energize the magnetic clutch 87 until the crank 83 reaches the upper end of its stroke, opening the gate 72, whereupon the cam 148 will allow the switch 147 to open, throwing the magnetic clutch 87 out of engagement and stopping the cam shaft 85.

This switch carries the cam shaft to the position shown in Figure 9, having operated the dispensing gate 72 and having raised the bar 88 to the top of its travel, at which time the cam 148 will open the switch 147, the cam shaft then becoming stationary. After the dash pot 93 has almost reached the bottom of its travel the bar 88 will contact the switch arm 150 to close the switch 96. Energy then will flow from the main line 120 through this switch, through the conductor 151', conductor 147'', conductor 146' into the magnetic clutch 87, starting the operation of the cam shaft 85 lowering the crank 83, pulling the rod 84 downward and closing the gate 72 through the lever and linkage above described. After the crank 83 reached the bottom of its travel and starts back up again the cam 83' will raise the bracket 90 and the lever 88 as sufficient amount to open the switch 96 demagnetizing the magnetic clutch 87 and stopping the operation of the cam shaft 85 and completing the dispensing cycle.

When the mixing paddles are being held stationary by the locking bolt 39 and the scraper assembly is being driven by the motor 126 through the shaft 10 and the refrigeration system is in operation, the motor 126 must not stop, therefore I have put on a shunt switch and circuit to maintain the electric circuit through the motor 126 closed while the mixing is being done.

This switch is indicated at 154 and is closed by the stop 155 which is mounted to the armature 51 of the solenoid 67. This stop closes the switch 154 when the spring 53 is maintaining the locking bolt 39 into engagement with the mixer assembly. The switch 154 closes the motor circuit from the conductor 141, through the relay 143, maintaining the motor 126 in operation as above described. As above described when the swell of the product raises the float 58 the solenoid 67 will be magnetized disconnecting the paddles from the locking bolt 39, and at the same time opening the switch 154 allowing the motor 126 to stop.

When the product is being dispensed the motor 126 is in operation in order to drive the magnetic clutch 87 and operating the cam shaft 85 operating the electric circuits as above described. Each time the switch 140 is operated a single dispensing operation will take place and as soon as this operation is completed the motor 126 ordinarily would be stopped through the switch 150 by the bar 88 as above described.

In the event it is desired to immediately dispense another portion of the product it is not desirable to allow the motor 126 to stop in between these dispensing operations. Therefore I supply a retarding switch 156 across the motor circuit between the conductor 119 and the conductor wire 142. This will maintain the relay switch 143 in operation, maintaining the circuit through the motor 126 closed. The retarding switch 156 is set to hold the circuit closed a sufficient period of time to permit a second operation of the switch 140 to initiate another vending operation. A cam 157 closes the switch 156 in the beginning of each cycle of operation and the dash pot 158 retards the opening of the switch after the cam has been released.

I do not wish to be limited to the exact mechanical structure as illustrated and described, as other mechanical and electrical equivalents may be substituted still coming within the scope of my claims.

What I claim is:

1. An ice cream and frozen confection freezer, including a confection freezing chamber, mixing means in said chamber, an electric motor for operating said mixing means, freezing means associated with said chamber, an electric motor operated freezing unit for supplying refrigeration to said freezing means, a thermostat associated with said freezing means, a switch controlled by said thermostat, said switch being closed when the temperature of the freezing unit is above a predetermined temperature, means operable to apply electrical energy to both of said motors when said switch is closed, and a delayed relay switch operable to maintain the application of electrical energy to said mixing means operating motor for a time after the opening of the circuit for the freezing unit motor by said thermostatically-controlled switch.

2. An ice cream and frozen confection freezer, including a confection freezing chamber, mixing means in said chamber comprising a rotary scraper and a mixing element, means for rotating said scraper, releasable means for holding said mixing element from rotating, and means operated by the expansion of the confection in the chamber for releasing the holding means to permit said mixing element to rotate with the scraper until the confection retracts.

3. An ice cream and frozen confection freezer, including a confection freezing chamber, mixing means in said chamber comprising a rotary scraper and a mixing element, means for rotating said scraper and mixing element, means for releasably holding said mixing element from rotating, means operated by the expansion of the confection in the chamber for releasing said releasable holding means to permit said mixing element to rotate with the scraper until the confection contracts, and means for maintaining the scraper rotating means in operation as long as the mixing element is held from rotation with the scraper.

4. An ice cream and frozen confection freezer and dispenser, including a confection freezing chamber with a dispensing opening therein, a closure for said opening, a mixing assembly in said chamber, a motor for operating said mixing assembly, means for operating the closure for the dispensing opening to open position and simultaneously effecting the operation of said motor for operating the mixing assembly during the dispensing operation, and means responsive to the expanded or contracted condition of the material for controlling the motor.

5. An ice cream and frozen confection freezer and dispenser, including a confection freezing chamber with a dispensing opening therein, a closure for said opening, a mixing assembly in said chamber, a motor for operating said mixing assembly under certain conditions of the freezer and confection therein, means for operating the closure for the dispensing opening to open position and simultaneously effecting the operation of said motor for operating the mixing assembly during the dispensing operation, and means for maintaining the operation of said motor for a limited time after each dispensing operation.

6. An ice cream and frozen confection freezer and dispenser, including a horizontal cylindrical freezing chamber having a dispensing opening therein adjacent to the bottom thereof at one end and a replenishing opening in its other end adjacent to the top thereof, closure means for said dispensing opening and means for operating the same to open position, refrigerating means surrounding the container, rotary scraping means within said container including spirally mounted blades, means for rotating said scraper so that said spiral blades will move the frozen confection in the container toward the dispensing end of the container, and means for maintaining the operation of said rotary scraping means for a limited time after each dispensive operation.

7. An ice cream and frozen confection freezer and dispenser, including a horizontal cylindrical freezing chamber having a dispensing opening therein adjacent to the bottom thereof at one end and a replenishing opening in its other end adjacent to the top thereof, closure means for said dispensing opening and means for operating the same to open position, refrigerating means surrounding the container, rotary scraping means within said container including spirally mounted blades, means for rotating said scraper so that said spiral blades will move the frozen confection in the container toward the dispensing end of the container, a chamber for confection liquid material for replenishing the freezing chamber, and means for introducing a measured quantity thereof into the replenishing opening of the container following the operation of the dispensing opening closure means for dispensing a measured quantity of frozen confection from the freezing chamber.

8. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, means including lever mechanism actuated by said rotating means for opening and closing said dispensing opening closure means in response to the closure of said manually operated switch, and a pump operated by said lever mechanism for drawing a measured quantity of the liquid confection from the liquid confection chamber during the opening of the dispensing closure means and transferring the same to the freezing chamber during operation of the lever mechanism for moving the dispensing closure means to closed position.

9. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, means including lever mechanism actuated by said rotating means for opening and closing said dispensing opening closure means in response to the closure of said manually operated switch, a pump operated by said lever mechanism for drawing a measured quantity of the liquid confection from the liquid confection chamber during the opening of the dispensing closure means and transferring the same to the freezing chamber during operation of the lever mechanism for moving the dispensing closure means to closed position, and means for adjusting the capacity of said pump for varying the amount of the measured quantity of liquid confection to be transferred to the freezing chamber.

10. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, means including lever mechanism actuated by said rotating means for opening and closing said dispensing opening closure means in response to the closure of said manually operated switch, a pump operated by said lever mechanism for drawing a measured quantity of the liquid confection from the liquid confection chamber during the opening of the dispensing closure means, and transferring the same to the freezing chamber during operation of the lever mechanism for moving the dispensing closure means to closed position, said lever actuating mechanism including an electro-magnetic clutch operable to effect the rotation of said dispensing and replenishing actuating mechanism, and means for energizing said clutch to effect operation of the lever mechanism upon momentary actuation of the manually operated control switch.

11. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, a cam shaft, operating means adapted to rotate said cam shaft upon an actuation of said manual control switch, means including lever mechanism actuated by said cam shaft for opening and closing said dispensing opening closure means, and a pump operated by said lever mechanism for drawing a measured quantity of the liquid confection from the liquid confection chamber during the opening of the dispensing closure means and transferring the same to the freezing chamber during the operation of the lever mechanism for moving the dispensing closure means to closed position.

12. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, a cam shaft, operating means including an electro-magnetic clutch for rotating said cam shaft, means including lever mechanism actuated by said cam shaft for opening and closing said dispensing opening closure means, a pump operated by said lever mechanism for drawing a measured quantity of the liquid confection from the liquid confection chamber during the opening of the dispensing closure means and transferring the same to the freezing chamber during operation of the lever mechanism for moving the dispensing closure means to closed position, and switch operating cams on said cam shaft operable on switches for effecting the continuous operation of the scraper blades rotating means for a predetermined period and the energization of the electro-magnetic clutch for rotating the cam shaft following each momentary operation of the manually operated control switch.

13. A freezing and dispensing apparatus as set forth in claim 7 wherein said operating means for the dispensing opening closure means and said liquid introducing means comprises a manually operated control switch, means for effecting the operation of the scraper blades rotating means for a predetermined time upon the closing of said switch, a cam shaft, operating means adapted to rotate said cam shaft upon an actuation of said manual control switch, means including lever mechanism actuated by said cam shaft for opening and closing said dispensing opening closure mechanism, a pump operated by said lever mechanism for drawing a measured quantity of the liquid confection from the liquid confection chamber during the opening of the dispensing closure means and transferring the same to the freezing chamber during the operation of the lever mechanism for moving the dispensing closure means to closed position, and means operable to prevent said manually operable control switch from initiating another operation of the dispensing means until a complete cycle of operation of dispensing has been completed.

14. An ice cream and frozen confection freezer and dispenser comprising a freezing chamber having a dispensing opening, a dispensing gate for closing said opening, scraper bars running in said chamber, mixing paddles associated with the scraper bars, a motor for driving said scrapers and paddles, a float communicating with the freezing chamber and operated by the swell of the frozen product, a mechanism controlled by the operation of said float for holding the mixing paddles against the driving of said motor, a refrigeration system for supplying refrigerant to the freezing chamber, a magnetic clutch driven by said motor, a cam shaft driven by the said clutch, a mechanism connected to the cam shaft for opening an ice cream dispensing gate, a dash pot operable on said dispensing gate opening mechanism for holding said dispensing gate open a predetermined length of time, an electric circuit controlled by the operation of the dash pot for operating the mechanism for closing the ice cream dispensing gate, a feed pump for injecting fresh mix into the freezing chamber, said feed pump being operated by the mechanism for operating the dispensing gate.

15. An ice cream and frozen confection freezer including a confection freezing chamber, mixing means in said chamber, an electric motor for operating said mixing means, freezing means associated with said chamber, an electric motor operated freezing unit for supplying refrigeration to said freezing means, a thermostat associated with said freezing means, a switch controlled by said thermostat, said switch being closed when the temperature of the freezing unit is above a predetermined temperature, means operable to apply electrical energy to both of said motors when said switch is closed, said freezer having a dispensing opening and a gate for closing the same, and means for operating said gate by said mixing means operating motor.

16. An ice cream and frozen confection freezer including a confection freezing chamber, mixing means to said chamber, an electric motor for operating said mixing means, freezing means associated with said chamber, an electric motor operated freezing unit for supplying refrigeration to said freezing means, a thermostat associated with said freezing means, a switch controlled by said thermostat, said switch being closed when the temperature of the freezing unit is above a predetermined temperature, means operable to apply electrical energy to both of said motors when said switch is closed, said freezer having a dispensing opening and a gate for closing the same, means for operating said gate by said mixing means operating motor, and a control switch for operating said motor for operating the gate in conjunction with said mixing means.

17. An ice cream and frozen confection freezer including a confection freezing chamber, mixing means to said chamber, an electric motor for operating said mixing means, freezing means associated with said chamber, an electric motor operated freezing unit for supplying refrigeration to said freezing means, a thermostat associated with said freezing means, a switch controlled by said thermostat, said switch being closed when the temperature of the freezing unit is above a predetermined temperature, means operable to apply electrical energy to both of said motors when said switch is closed, said freezer having a dispensing opening and a gate for closing the same, means for operating said gate by said mixing means operating motor, a control switch for operating said motor for operating the gate in conjunction with said mixing means, a supply tank for confection material, a pump for introducing the confection material from the supply tank into the freezer, and lever means between the gate operating means and pump for operating the pump each time said gate is opened for dispensing frozen confection material from the freezer through the dispensing opening.

18. An ice cream and frozen confection freezer and dispenser, including a freezing chamber and refrigerating unit for supplying refrigerant thereto, said freezing chamber having a dispensing opening and a gate therefor and a receiving opening, a pump for replenishing confection material through said opening, mixing means in the refrigerating chamber, means for operating said mixing means in accordance with the freezing condition of the confectionery material in the freezing chamber, and a switch controlled means for effecting the operation of said mixing operating means and simultaneously the operation of the dispensing gate and confection replenishing pump for a dispensing operation.

19. An ice cream and frozen confection freezer and dispenser, including a freezing chamber and refrigerating unit for supplying refrigerant thereto, said freezing chamber having a dispensing opening and a gate therefor and a receiving opening, a pump for replenishing confection material through said opening, mixing means in the refrigerating chamber, means for operating said mixing means in accordance with the freezing condition of the confectionery material in the freezing chamber, a switch controlled means for effecting the operation of said mixing operating means and simultaneously the operation of the dispensing gate and confection replenishing pump for a dispensing operation, and means for effecting the operation of said mixing operation means for a period of time following the completion of a dispensing operation.

20. An ice cream and frozen confection freezer and dispenser, including a freezing chamber and refrigerating unit for supplying refrigerant thereto, said freezing chamber having a dispensing opening and a gate therefor and a receiving opening, a pump for replenishing confection material through said opening, mixing means in the refrigerating chamber, means for operating said mixing means in accordance with the freezing condition of the confectionery material in the freezing chamber, a switch controlled means for effecting the operation of said mixing operating means and simultaneously the operation of the dispensing gate and confection replenishing pump for a dispensing operation, and means for effecting the operation of said mixing operating means continuously during and for a period of time following the completion of a dispensing operation.

21. An ice cream and frozen confection freezer and dispenser, including a freezing chamber and refrigerating unit for supplying refrigerant thereto, said freezing chamber having a dispensing opening and a gate therefor and a receiving opening, a pump for replenishing confection material through said opening, mixing means in the refrigerating chamber, means for operating said mixing means in accordance with the freezing condition of the confectionery material in the freezing chamber, a switch controlled means for effecting the operation of said mixing operating means and simultaneously the operation of the dispensing gate and confection replenishing pump for a dispensing operation, means for effecting the operation of said mixing operating means and simultaneously the operation of the dispensing gate and confection replenishing pump for a dispensing operation, means for effecting the operation of said mixing operating means continuously during a dispensing operation, and means operable during a dispensing operation to effect a continuance of the operation of the mixing operating means for a period of time thereafter.

22. An ice cream and frozen confection freezer and dispenser, including a freezing chamber and refrigerating unit for supplying refrigerant thereto, said freezing chamber having a dispensing opening and a gate therefor and a receiving opening, a pump for replenishing confection material through said opening, mixing means in the refrigerating chamber, means for operating said mixing means in accordance with the freezing condition of the confectionery material in the freezing chamber, a switch controlled means for effecting the operation of said mixing operating means and simultaneously the operation of the dispensing gate and confection replenshing pump for a dispensing operation, and means to prevent another dispensing operation from being initiated before the completion of a dispensing operation in progress.

23. An ice cream and frozen confection freezer and dispenser including a confection freezing chamber and refrigerating means therefor, said freezing chamber having a dispensing opening and a gate therefor, means for operating said dispensing gate and including a rotary cam shaft and levers operated thereby for opening and closing the gate, means for effecting a limited rotation of said shaft to open the gate, and means operable after the gate has been opened for a period of time for also effecting rotation of said shaft to complete the cycle of a dispensing operation.

24. An ice cream and frozen confection freezer and dispenser, including a confection freezing chamber and refrigerating means therefor, mixing means in the freezing chamber, said freezing chamber having a dispensing opening and a gate therefor, means for operating said dispensing gate and including a rotary cam shaft and levers operated thereby for opening and closing the gate, means for effecting a limited rotation of said shaft to open the gate, means operable after the gate has been opened for a period of time for also effecting rotation of said shaft to complete the cycle of a dispensing operation, means for operating the mixing means in accordance with the freezing condition of the confection in the freezing chamber, means for operating the mixing means during a dispensing operation, and means operated by the cam shaft for effecting continuance of operation of the mixing means for a period of time after the completion of a dispensing operation.

25. An ice cream and frozen confection freezer and dispenser including a confection freezing chamber and refrigerating means therefor, said freezing chamber having a replenishing opening therein for receiving confectionery material, a pump for pumping the material into the freezing chamber through said opening, said freezing chamber having a dispensing opening and a gate therefor, means for operating said dispensing gate and including a rotary cam shaft and levers operated thereby for opening and closing the gate, means for effecting a limited rotation of said shaft to open the gate, means operable after the gate has been opened for a period of time for also effecting rotation of said shaft to complete the cycle of a dispensing operation, and a connection between said gate operating levers and the pump for drawing confection material into the pump during the opening of the gate and ejecting the material therefrom and into the freezing chamber during the closing of the gate.

26. An ice cream and frozen confection freezer including a confection freezing chamber, thermostatically controlled refrigerating means for supplying refrigeration to said freezing chamber, mixing means in said chamber comprising a rotary scraper and a mixing element, means for rotating said scraper and mixing element, means for releasably holding said mixing element from rotating, means operated by the expansion of the confection in the chamber for releasing said releasable holding means to permit said mixing element to rotate with the scraper until the confection contracts, means for maintaining the scraper rotating means in operation as long as the mixing element is held from rotation with the scraper, and means for effecting the operation of said refrigerating means as long as the mixing element is held from rotation with the scraper.

ANDREW J. TACCHELLA.

REFERENCES CITED

The following references are of record in the file of this patent:

UNITED STATES PATENTS

| Number | Name | Date |
|---|---|---|
| 2,131,510 | Gray et al. | Sept. 27, 1938 |
| 2,304,094 | Holmen | Dec. 8, 1942 |
| 2,522,648 | Tacchella | Sept. 19, 1950 |